(12) United States Patent
Garrido et al.

(10) Patent No.: US 6,367,758 B1
(45) Date of Patent: Apr. 9, 2002

(54) SNAP-ON TORQUE TUBE FOR SEAT TRACK ASSEMBLY

(75) Inventors: Pascal E. Garrido, Gravehurst; Mark Volkmann, Bracebridge, both of (CA); Joseph Allen Wilbanks, II, Hermitage, TN (US); Nathan Allen Clark, Warren, MI (US); Gregory D. Collins, Gravehurst; Christopher Clifford, Bracebridge, both of (CA); Jack P. Pogodzinski, Orion, MI (US)

(73) Assignee: Dura Global Tachnologies, Rochester Hills, MI (US)

( * ) Notice: Subject to any disclaimer, the term of this patent is extended or adjusted under 35 U.S.C. 154(b) by 0 days.

(21) Appl. No.: 09/430,082

(22) Filed: Oct. 29, 1999

(51) Int. Cl.[7] ................................................ F16M 13/00
(52) U.S. Cl. ................ 248/421; 248/429; 296/65.18; 297/344.1
(58) Field of Search ................ 248/429, 421, 248/424, 419, 430; 297/344.1, 463.1, 463.2; 296/65.18, 65.05

(56) References Cited

U.S. PATENT DOCUMENTS

| | | | | |
|---|---|---|---|---|
| 3,669,398 A | * | 6/1972 | Robinson | 248/373 |
| 4,186,904 A | * | 2/1980 | Reinmoller et al. | 248/395 |
| 4,309,015 A | * | 1/1982 | Muhr | 248/396 |
| 4,331,313 A | * | 5/1982 | Pickles | 248/394 |
| 4,470,318 A | * | 9/1984 | Cremer et al. | 74/353 |
| 4,488,699 A | * | 12/1984 | Chevalier | 248/396 |
| 5,123,622 A | * | 6/1992 | Matsumoto et al. | 248/421 |
| 5,487,583 A | * | 1/1996 | Ikegaya et al. | 296/65.1 |
| 5,899,428 A | * | 5/1999 | Gaunger | 248/430 |
| 6,145,914 A | * | 11/2000 | Downey et al. | 296/65.18 |

* cited by examiner

Primary Examiner—Anita King
Assistant Examiner—Kimberly Wood
(74) Attorney, Agent, or Firm—C. R. Kiczek

(57) ABSTRACT

A vehicle seat assembly includes a seat bottom and a seat back supported for movement relative to the seat bottom such that seat position can be adjusted forwardly or rearwardly with respect to the vehicle. The seat assembly is mounted to a vehicle structure and includes a first track and a second track supported for movement relative to the first track with the seat bottom being supported on the second track for movement with the second track. A support member presents a bearing surface that rotatably engages a bearing surface on the second track. At least one adjustment link is used to interconnect the support member and the seat bottom. The adjustment link is mounted on the support member for rotation therewith to provide vertical seat adjustment. A torque tube engages the support member to provide rotational input to the adjustment link.

21 Claims, 4 Drawing Sheets

SNAP-ON TORQUE TUBE FOR SEAT TRACK ASSEMBLY

BACKGROUND OF THE INVENTION

This invention relates to seat adjuster for a seat track assembly with a unique torque tube mounting configuration. Specifically, a plug member is rotatably supported on a seat track member and the torque tube engages the plug member to provided rotational input for vertical seat adjustment.

Seat adjusters are often used in seat assemblies for selectively adjusting the position of a vehicle seat. Seat adjusters have inboard and outboard track assemblies for horizontal seat adjustment. Typically each seat track assembly has a first track member is fixed to a vehicle structure, such as a floor, and a second track member is supported on the first track member for movement relative to the first track member such that the seat position can be adjusted forwardly or rearwardly with respect to the vehicle. The adjustment of the seat assembly is controlled by either a mechanical actuator, an electrical actuator, or an electro-mechanical actuator.

Typically, vertical seat adjustment is accomplished by torque tubes that actuate a drive link assembly that is connected to a seat bottom. An input is provided to the torque tubes which rotate to cause the drive links to move the seat bottom between a raised and lowered position. The torque tubes are installed such that they extend between the inboard and outboard track assemblies. Usually there is one torque tube installed between the track assemblies near the forward end for vertically adjusting the front portion of the seat and a second torque tube is installed between the track assemblies near the rearward end for vertically adjusting the rear portion of the seat.

The torque tubes are typically attached to the track assemblies with brackets and fasteners. This requires the seat adjusters to be shipped in a fully assembled condition. This takes up a significant amount of shipping space, which is undesirable. It would be desirable to have a simplified attachment for installing the torque tubes in the seat tracks such that the track assemblies and torque tubes could be shipped in an uninstalled configuration. The improved attachment should allow the torque tubes and the seat track assemblies to be quickly and easily connected on the assembly line.

SUMMARY OF THE INVENTION

In a disclosed embodiment, a seat mounting assembly includes a first track defining a longitudinal axis and a second track including a side wall having an opening. The first track is mounted to a vehicle structure and the second track is supported for linear movement relative to the first track along the longitudinal axis. A support member has a first portion that is partially received within the opening in the second track and is mounted for rotation with respect to the second track. At least one torque tube is supported by a second portion of the plug for rotation therewith to provide vertical seat adjustment.

In one embodiment, the support member includes a main body with an inner end and an outer end. The inner end has a first cross-sectional shape and presents a first external surface to define the first portion. The outer end has a second cross-sectional shape and presents a second external surface to define the second portion. In one preferred embodiment, the first cross-sectional shape is different than the second cross-sectional shape; specifically, the first cross-sectional shape is circular and the second cross-sectional shape is polygonal. The torque tube includes an elongated body with a central bore having a polygonal shape corresponding to the second cross-sectional shape. The outer end of the support member is received within the central bore to interconnect the support member and the torque tube.

Preferably, at least one adjustment link is mounted on the support member for rotation therewith to provide vertical seat adjustment to a seat bottom. The torque tube is connected to the support member and provides rotational input to the adjustment link. The adjustment link is mounted for rotation with the support member and is positioned between the second track and the torque tube.

A method of assembling the seat adjuster apparatus includes the following steps: providing a first track and a second track supported for movement relative to the first track and including a first bearing surface; inserting a support member into the second track such that the support member rotates relative to the second track; and mounting at least one adjustment link on the support member for rotation therewith. Additional steps include sliding a torque tube into engagement with the support member for providing rotational input to the adjustment link and deforming an end of the support member into engagement with the second track to prohibit axial movement relative thereto.

The subject invention provides a simplified torque tube mounting configuration for a seat adjuster that is durable, easily installed, and is inexpensive. Further, the improved mount reduces required packaging space for shipping the seat adjuster to the assembly plant. These and other features can be understood from the following specification and drawings.

DETAILED DESCRIPTION OF THE PREFERRED EMBODIMENT

Figure 1:
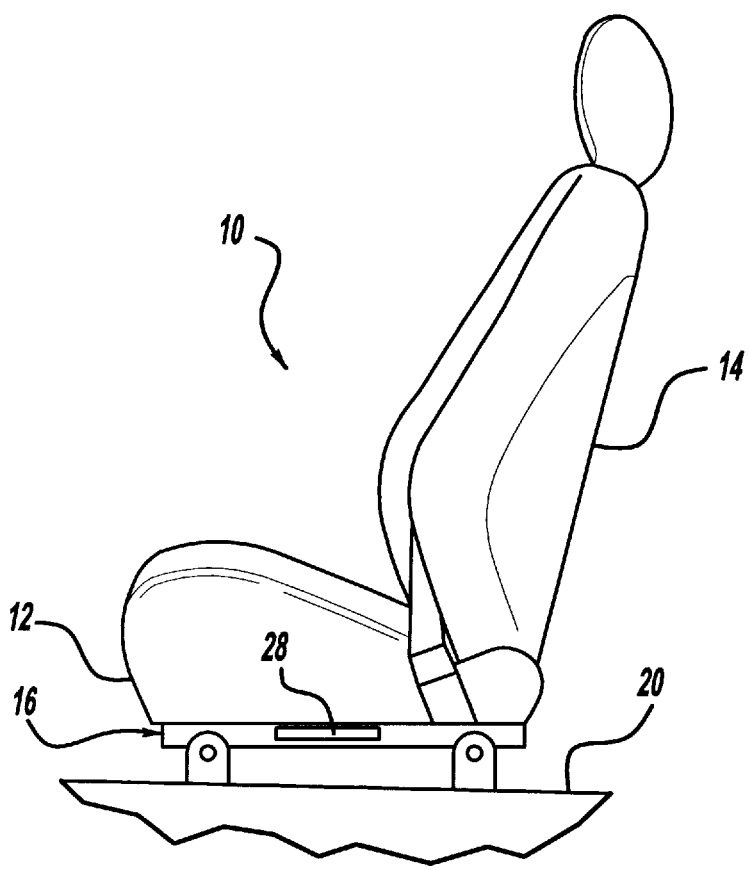
FIG. 1 is a side schematic view of a seat assembly incorporating the inventive torque tube configuration.

A vehicle seat assembly 10, shown in FIG. 1, includes a seat bottom 12 and a seat back 14 supported with respect to the seat bottom 12. A seat mounting assembly 16 is used to mount the seat assembly 10 to a vehicle structure 20, such as a floor. An actuator 28 is used to adjust the position of the seat 10. The adjustment of the seat assembly can be controlled by either a mechanical actuator, an electrical actuator, or an electro-mechanical actuator.

Figure 2:
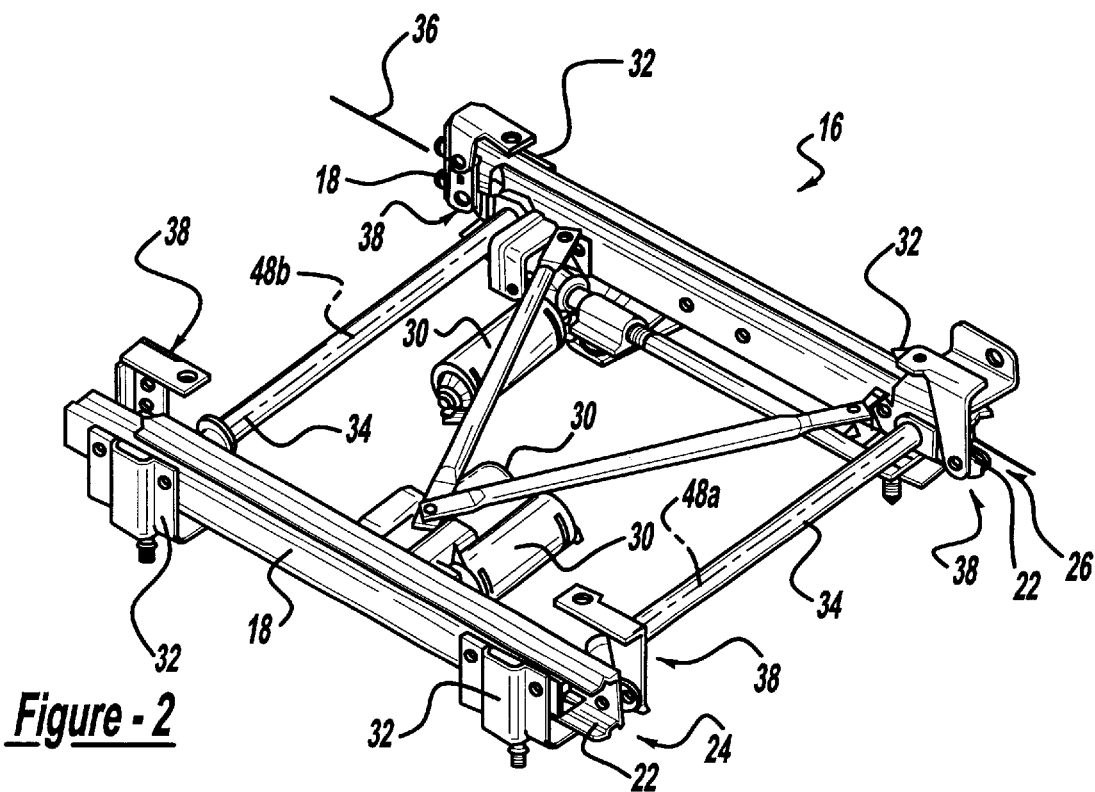
FIG. 2 is a perspective view of a seat track assembly incorporating the inventive torque tube configuration.

The seat mounting assembly 16 includes a first track 18 that is mounted to the vehicle structure 20 and a second track 22 that slides with respect to the lower track 18, as shown in FIG. 2. The tracks 18, 22 define a longitudinal axis 36. The second track 22 moves with respect to the first track 18 along the longitudinal axis.

The seat bottom 12 is supported on the second track 22 for movement with the second track 22 for seat adjustment between forward or rearward positions. Preferably, the first track 18 is an outer track that is mounted to the vehicle floor and the second track 22 is an inner track that is received over the first track 18, however, it should be noted that the terms inner, outer, forward, rearward, upper, and lower, as used in this description, are for illustration purposes only and cannot be considered limiting.

The mounting assembly 16 includes track assemblies on an inboard side 24 and an outboard side 26 of the seat assembly 10. The actuator 28, shown in FIG. 2, is used by a seat occupant for selectively providing input to the mounting assembly 16 to control the movement of the second track 22 with respect to the first track 18. The actuator 28 preferably an electrical switch assembly that actuates various electrical motors 30 to move the seat back 14 and seat bottom 12 between a variety of seat positions. The actuator can control horizontal seat position, vertical seat position, and/or the angular position of the seat back 14 relative to the seat bottom 12. The actuator 28 is operably connected to both the inboard 24 and outboard 26 track assemblies. The terms inboard and outboard are used in this description for clarity and illustration purposes only and cannot be considered limiting.

Brackets 32 are used to mount the first track 18 to the vehicle floor on both the inboard 24 and outboard 26 sides. Vertical seat adjustment is accomplished by torque tubes 34 that extend from inboard track assembly 24 to the outboard track assembly 26. At least one torque tube 34 is needed to adjust the position of the seat 10 between raised and lowered positions, however, preferably two (2) torque tubes 34 are used for vertical seat adjustment. Preferably, one torque tube 34 is located near the front of the seat 10 and one torque tube 34 is located near the rear of the seat 10. The torque tubes 34 work together to raise and lower the seat 10 upon receipt of input from the actuator 28. A drive link assembly 38 is supported on the torque tubes 34 and is connected to the seat bottom 12 or seat pan.

Figure 3:
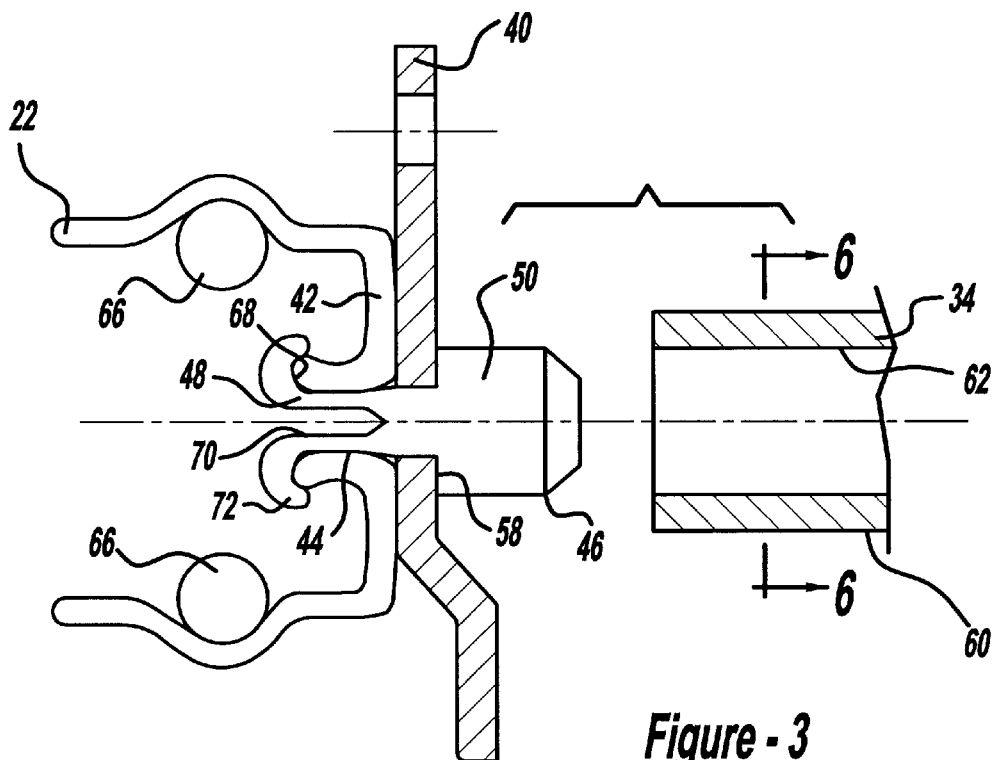
FIG. 3 is a cross-sectional view, partially cut-away of the torque tube, plug member, and seat track assembly.

The connection between the torque tube 34 and seat track 22 is shown in greater detail in FIG. 3. The drive link assembly 38 includes at least one adjustment link 40 that is fixed for rotation with the torque tube 34. The adjustment link 40 can either be directly connected to a seat bottom bracket or seat pan or can be connected to the seat bottom via other link members. When the torque tube 34 receives input from the actuator 28 it rotates, causing the adjustment link 40 to rotate. As the adjustment link 40 rotates the other links also move causing the seat bottom 12 to move in either an upward or downward direction.

The seat 10 can also be adjusted horizontally as is known in the art. A plurality of ball bearings 66 are installed between the first 18 and second 22 track members. The ball bearings 66 are installed along the length of the tracks 18, 22 and provide easy sliding adjustment of the second track 22 with respect to the first track 18. While this configuration is preferred, it should be understood that other known horizontal adjustment mechanisms could also be used.

The second track 22 has a side wall 42 with an opening 44. The opening 44 extends inwardly and presents a bearing surface that rotatably engages an exterior bearing surface on a plug or other support member 46 that is inserted into the opening 44. The support member 46 has a first portion 48 and a second portion 50. The first portion 48 of the support member 46 is partially received within the opening 44 to form the rotation interface between the support member 46 and the second track 22. The torque tube 34 is supported by the support member 46 on the second portion 50. The attachment of the torque tube 34 to the support member 46 is preferably a snap-fit attachment.

The adjustment link 40 is fixed to rotate with the support member 46 and is mounted on the support member 46 between the first 48 and second 50 portions. The torque tube 34 provides rotational input to the support member 46 which causes adjustment link 40 to rotate resulting in vertical seat adjustment.

Figure 4:
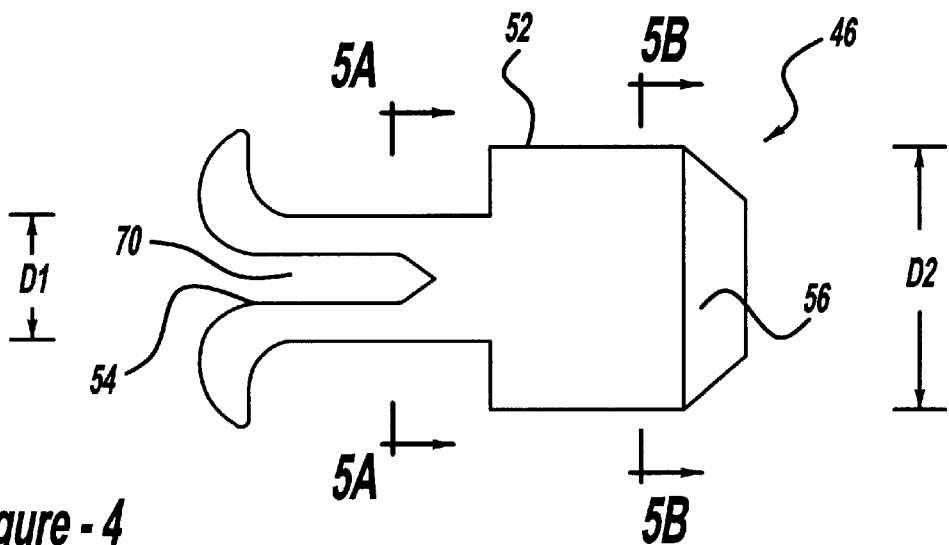
FIG. 4 is a side view of the plug member shown in FIG. 3.
Figure 5A:
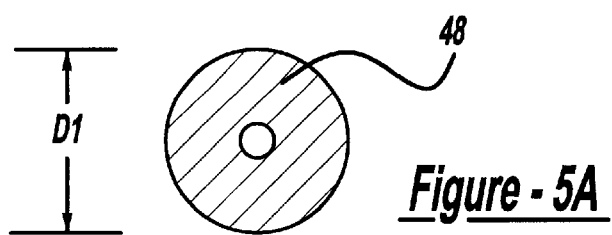
FIG. 5A is a cross-sectional view taken along lines 5A—5A of FIG. 4.
Figure 5B:
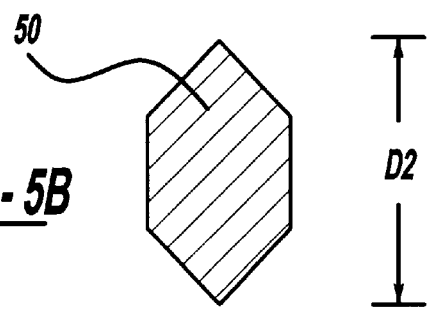
FIG. 5B is a cross-sectional view taken along lines 5B—5B of FIG. 4.

As shown in FIG. 4, the support member 46 includes a main body 52 with an inner end 54 and an outer end 56. The inner end 54 has a first cross-sectional shape, shown in FIG. 5A, and presents a first external surface which together define the first portion 48. The outer end 56 has a second cross-sectional shape, shown in FIG. 5B and presents a second external surface which together define the second portion 50. The first cross-sectional shape is preferably different than the second cross-sectional shape and in the preferred embodiment, the first cross-sectional shape is circular and the second cross-sectional shape is polygonal.

The first cross-sectional shape is defined by a first width D1 and the second cross-sectional shape is defined by a second width D2 that is greater than the first width D1. Because the second portion 50 has a greater width D2 than the first portion 48, an edge 58 is formed at one end of the second portion 50. The edge 58 is used to locate the adjustment link 40 between the second track 22 and the second portion 50 of the support member 46.

Figure 6:
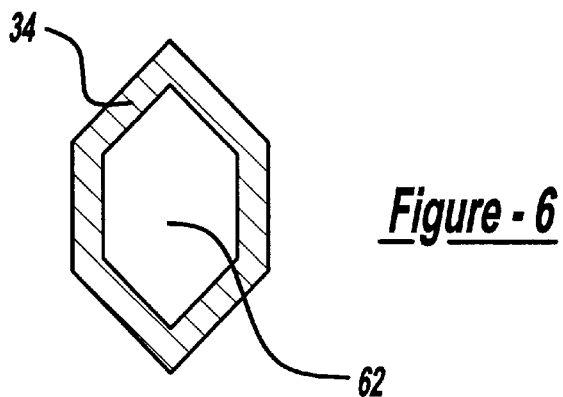
FIG. 6 is a cross-sectional view taken along lines 6—6 of FIG. 3.

The torque tube 34 includes an elongated body 60 with a central bore 62 having polygonal shape, shown in FIG. 6, corresponding to the second cross-sectional shape of the support member 46. The outer end 56 is received within the central bore 62 to interconnect the support member 46 and the torque tube 34. The circular inner end 54 allows the support member 46 to easily rotate with respect to the second track 22 while the polygonal shaped outer end 56 provides an easy attachment to the torque tube 34 for rotation therewith. The torque tube 34 is installed on the support member 46 by sliding the tube 34 over the outer end 56.

As shown in FIG. 4, the opening 44 in the second track 22 includes an inwardly extending lip 68 and the inner end 54 of the support member 46 is preferably hollow to form a recess 70. The support member 46 is then staked or spin riveted to form a flange 72 that engages the lip 68. The engagement between the flange 72 and lip 68 prevents the support member 46 from axial movement with respect to the second track 22 but allows rotary movement. Thus, there is a rotary connection between the support member 46 and track 22 and a slip fit connection from the torque tube 34 to the support member 46.

As discussed above, the support member 46 is a male member and the torque tube is a female member that receives the male member. Preferably, the polygonal shape of the male member is a hexagon (six-sided) formation, shown in FIG. 5B. The corresponding shape of the bore 62 in the torque tube 34 is also a hexagon. While a hexagon shape is preferred, it should be understood that any multi-sided shape could be used, such as a triangle, square, or pentagon, for example. The multi-sided shape allows the torque tube 34 to be easily slid onto the support member 46 and the reaction between the sides of the bore 62 and the sides of the support member 46 cause the torque tube 34 and support member 46 to rotate together.

Figure 7:
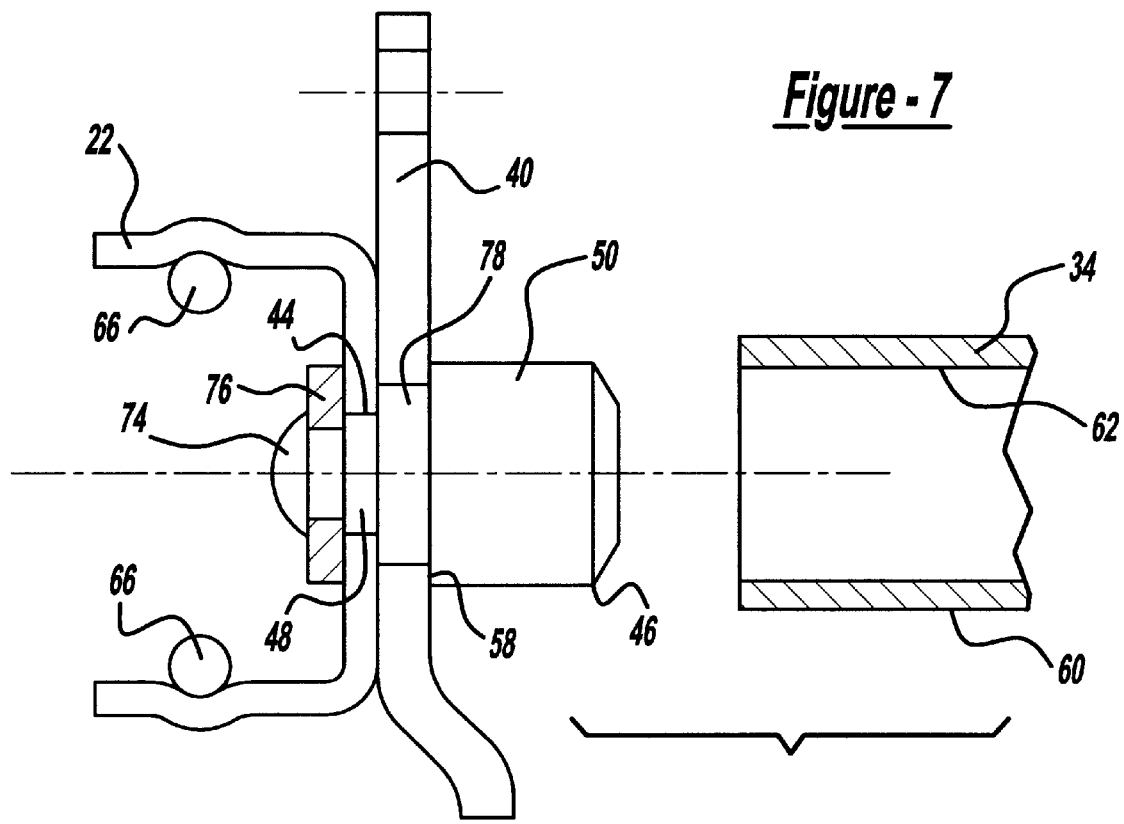
FIG. 7 is a side view, in partial cross-section, of an alternate embodiment.
Figure 8:
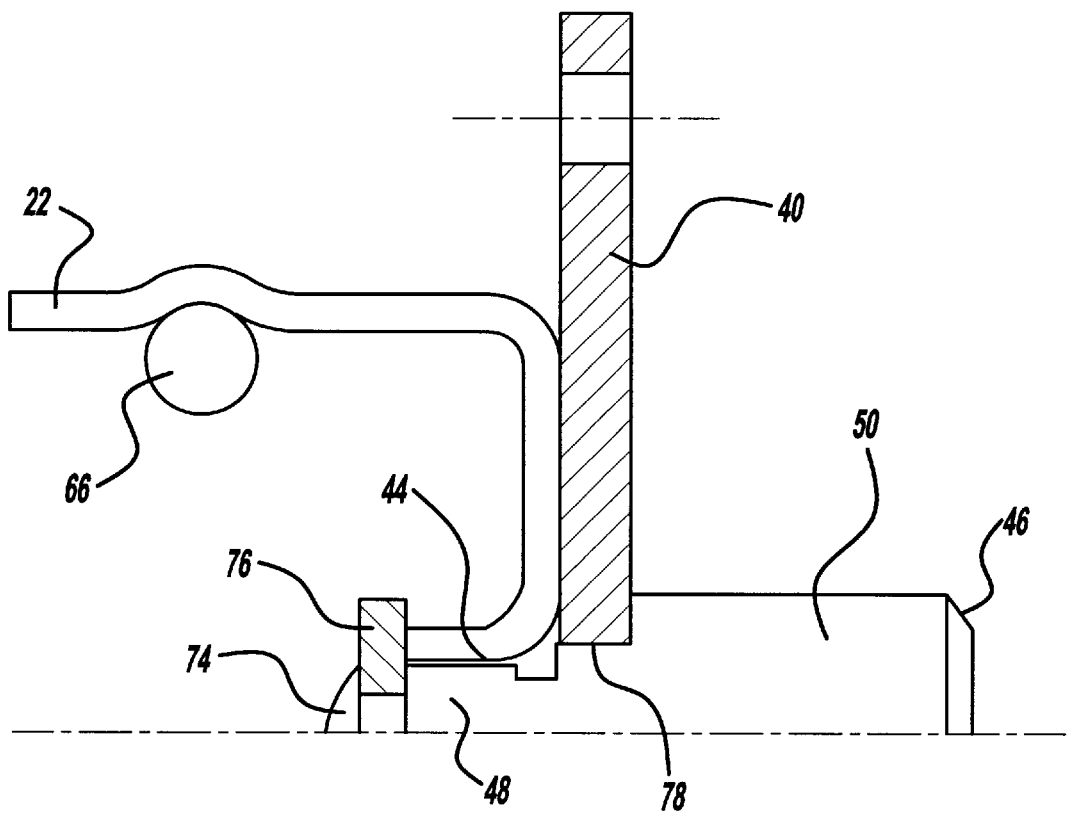
FIG. 8 is a side view, in partial cross-section, of an alternate embodiment.

An alternate attachment method for the support member 46 is shown in FIG. 7. The support member 46 is inserted through the opening 44 in the sidewall of the second track 22 and is held in place by a nut 74 and washer 76. Optionally, the opening 44 can be extruded, as shown in FIG. 8, to increase the bearing surface between the second track 22 and the support member 46. The first portion 48 and the second portion 50 of the support member 46 are interconnected by an intermediate portion 78. The intermediate portion 78 has a larger diameter than the first portion 48 and a smaller diameter than the second portion 50. The adjustment link 40 is mounted on the intermediate portion 78.

The method of assembling the seat adjuster apparatus includes the following steps. A first track 18 and a second track 22 are provided where the second track 22 is supported for movement relative to the first track 18 and includes a first bearing surface. The support member 46 is inserted into the second track 22 such that the support member 46 rotates relative to the second track 22. The adjustment link 40 is mounted on the support member 46 for rotation with the member 46 and the torque tube 34 is slid into engagement with the support member 46 to provide rotational input to the adjustment link 40. An end 54 of the support member 46 is deformed into engagement with the second track 22 to prohibit axial movement relative thereto.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. An assembly for mounting a seat within a vehicle comprising:
    a first member for attachment to said vehicle and said seat, wherein said first member defines a longitudinal axis;
    a second member supported for movement relative to said first member along said longitudinal axis, said second member including a side wall having an opening;
    a plug having a first portion and a second portion wherein said plug is partially received within said opening such that said first portion rotatably engages said second member; and
    at least one torque tube supported by said plug via second portion for rotation therewith to provide vertical seat adjustment.

2. An assembly as recited in claim 1 wherein said plug includes a main body with an inner end and an outer end, said inner end having a first cross-sectional shape and presenting a first external surface to define said first portion and said outer end having a second cross-sectional shape and presenting a second external surface to define said second portion.

3. An assembly as recited in claim 2 wherein said first cross-sectional shape is different than said second cross-sectional shape.

4. An assembly as recited in claim 3 wherein said first cross-sectional shape is circular and said second cross-sectional shape is polygonal.

5. An assembly as recited in claim 4 wherein said torque tube includes an elongated body with a central bore having polygonal shape corresponding to said second cross-sectional shape, said outer end being received within said central bore to interconnect said plug and said torque tube.

6. An assembly as recited in claim 2 wherein said first cross-sectional shape is defined by a first width and said second cross-sectional shape is defined by a second width that is greater than said first width.

7. An assembly as recited in claim 2 including an adjustment link fixed to said plug for rotation therewith and mounted on said plug between said first and second portions.

8. An assembly as recited in claim 1 wherein said opening in said second member extends inwardly to define a bearing surface for rotatably engaging said first portion of said plug.

9. A seat adjuster assembly comprising:
    a first track mounted to a vehicle structure and defining a longitudinal axis;
    a second track supported for movement relative to said first track along said longitudinal axis;
    a support member mounted for rotation with respect to said second track;
    at least one adjustment link mounted on said support member for rotation therewith to provide vertical seat adjustment; and
    a torque tube connected to said support member for providing rotational input to said adjustment link.

10. An assembly as recited in claim 9 wherein said adjustment link is mounted on said support member between said second track and said torque tube.

11. An assembly as recited in claim 10 wherein said support member includes a main body with an inner end and an outer end, said inner end having a first cross-sectional shape and said outer end having a second cross-sectional shape different than said first cross-sectional shape.

12. An assembly as recited in claim 11 wherein said second track includes an opening that defines a bearing surface for rotatably supporting said inner end of said support member.

13. An assembly as recited in claim 12 wherein said first cross-sectional shape is circular and said second cross-sectional shape is polygonal.

14. An assembly as recited in claim 13 wherein said torque tube includes a polygonal shaped opening at one end corresponding in shape to said second cross-sectional shape, said polygonal shaped opening for receiving said outer end of said support member.

15. An assembly as recited in claim 14 wherein said opening in said second track includes an inwardly extending lip and said inner end includes a flange for engaging said lip to prevent said support member from axial movement with respect to said second track.

16. A vehicle seat assembly comprising
    a seat bottom;
    a seat back supported relative to said seat bottom;
    a first track defining a longitudinal axis;
    a second track supported for movement relative to said first track and including a first bearing surface, said seat bottom being supported on said second track for movement with said second track along said longitudinal axis;
    a support member presenting a second bearing surface for rotatably engaging said first bearing surface;
    at least one adjustment link interconnecting said support member and said seat bottom, said adjustment link being mounted on said support member for rotation therewith to provide vertical seat adjustment; and
    a torque tube engaging said support member to provide rotational input to said adjustment link.

17. An assembly as recited in claim 16 wherein said support member is a male member and said torque tube is a female member that receives said male member.

18. An assembly as recited in claim 16 wherein said support member includes a main body with an inner end and an outer end, said inner end having a flange for engaging said second track to prevent said support member from axial movement relative to said second track.

19. A method of assembling a seat adjuster apparatus comprising the steps of:
- (a) providing a first track and a second track supported for movement relative to the first track and including a first bearing surface;
- (b) inserting a support member into the second track such that the support member rotates relative to the second track;
- (c) mounting at least one adjustment link on the support member for rotation therewith; and
- (d) sliding a torque tube into engagement with the support member for providing rotational input to the adjustment link.

20. A method as recited in claim 19 including the step of deforming an end of the support member into engagement with the second track to prohibit axial movement relative thereto.

21. A method as recited in claim 19 wherein step (d) further includes connecting the torque tube and the support member in a snap-fit attachment.

* * * * *